US010242395B1

(12) United States Patent
Manjunathaiah

(10) Patent No.: US 10,242,395 B1
(45) Date of Patent: Mar. 26, 2019

(54) PROVIDING SHOPPING LINKS TO ITEMS ON A NETWORK PAGE

(71) Applicant: Amazon Technologies, Inc., Seattle, WA (US)

(72) Inventor: Pradeep Bangalore Manjunathaiah, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 849 days.

(21) Appl. No.: 14/701,082

(22) Filed: Apr. 30, 2015

(51) Int. Cl.
*G06F 17/30* (2006.01)
*G06K 9/00* (2006.01)
*G06Q 30/06* (2012.01)

(52) U.S. Cl.
CPC ... *G06Q 30/0623* (2013.01); *G06F 17/30253* (2013.01); *G06F 17/30882* (2013.01)

(58) Field of Classification Search
CPC .... G06Q 50/01; G06Q 30/02; G06K 7/10861; G06K 9/3258
See application file for complete search history.

(56) References Cited

U.S. PATENT DOCUMENTS

| 7,382,903 | B2* | 6/2008 | Ray | G06F 17/30256 |
| | | | | 382/115 |
| 8,787,707 | B1* | 7/2014 | Steves | G06Q 30/02 |
| | | | | 382/181 |
| 8,958,633 | B2* | 2/2015 | Harvill | G06T 7/0081 |
| 9,213,920 | B2* | 12/2015 | Harvill | H04N 1/387 |
| 9,354,778 | B2* | 5/2016 | Cornaby | G06F 3/04847 |
| 9,626,639 | B2* | 4/2017 | Gibbon | G06Q 10/06315 |
| 9,760,789 | B2* | 9/2017 | Burry | G06K 9/3258 |
| 9,773,285 | B2* | 9/2017 | Calman | G06Q 50/01 |
| 2012/0229657 | A1* | 9/2012 | Calman | G06Q 50/01 |
| | | | | 348/207.1 |
| 2014/0029796 | A1* | 1/2014 | Fiorini | G06K 7/10861 |
| | | | | 382/103 |
| 2015/0120661 | A1* | 4/2015 | Keebler | G06F 17/30575 |
| | | | | 707/627 |

* cited by examiner

*Primary Examiner* — Talia F Crawley
(74) *Attorney, Agent, or Firm* — Kilpatrick Townsend & Stockton LLP

(57) ABSTRACT

Techniques for providing shopping links to items may be provided. For example, an item logo and an item color can be detected from an image of an item on a network page. An item attribute of the item may also be determined (e.g., a model number of the item, type or brand, etc.). The item may be identified by the item attribute, item logo, and/or item color. A link may be enabled to be displayed at the network page, which provides access to the item via an electronic marketplace. The link may be displayed within a threshold distance from the image of the item on the network page (e.g., as a hotspot, etc.).

19 Claims, 13 Drawing Sheets

PROVIDING SHOPPING LINKS TO ITEMS ON A NETWORK PAGE

BACKGROUND

Users frequently browse news aggregation websites to gather information and learn about world events. Some of these websites offer item reviews, images of celebrities, authors' opinions on various topics, and a variety of other information that may be useful to the users. However, when these users are looking at images of celebrities, for example, they may look up to these celebrities and what they embody, or like the surroundings of these celebrities (e.g., furniture, location, accessories). Sometimes, there are objects that users might like to purchase.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for providing shopping links to items (e.g., analyzing an image to identify an item identifier associated with an item in the image). For example, an item logo (e.g., Acme Brand, Beta Co., etc.) and an item color (e.g., red/green/blue (RGB) value, etc.) can be detected from an image of an item on a network page (e.g., website, webpage, or other accessible location to provide a journal, blog, images/information about a celebrity, a first electronic marketplace that offers items for purchase from multiple merchants, etc.). An item attribute of the item may also be determined (e.g., a model number of the item, type or brand, etc.). The item may be identified by the item attribute (e.g., "A100," a unique identifier for an item offered for sale, an identifier associated with the brand, model, color, etc. of many similar items, etc.), item logo, and/or item color. A link may be enabled to be displayed at the network page, which provides access to the item via the electronic marketplace. The link may be displayed within a threshold distance from the image of the item on the network page and/or a hotspot associated with the item.

In an illustrative example, a user browses to a fan webpage of a celebrity athlete, which shows the celebrity's favorite shoes, shirt, sports equipment, and other items. The webpage also informs the user of particular brands and colors of the items, which might be associated with the celebrity athlete's sponsors. A computing device may scan the fan webpage, identify attributes of individual items (e.g., logos, colors, model numbers, shape/boundaries of items in the images, etc.), and compare that identified information with known information about the items for sale. If at least one of the items is offered for sale through the separate webpage, the computing device can add a hotspot around the item on the celebrity fan webpage with a link to the item at the separate webpage. When the user hovers over the item with the hotspot, a link may appear and direct the user to the item for purchase.

Figure 1:
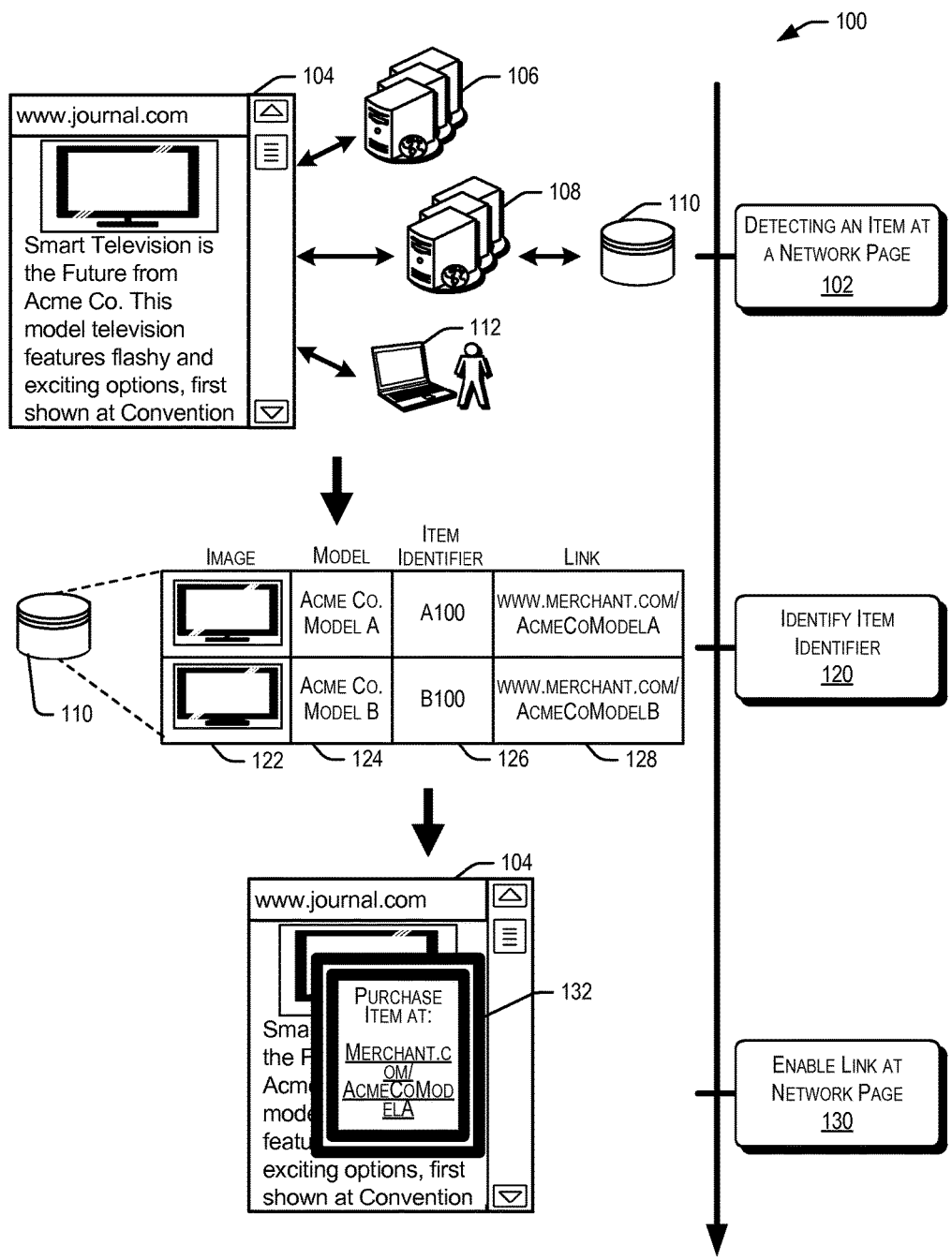
FIG. 1 illustrates an illustrative flow for providing shopping links to items described herein, according to at least one example.

FIG. 1 illustrates an illustrative flow for providing shopping links to items described herein, according to at least one example. The process 100 can begin with detecting an item at a network page at 102. For example, the network page 104 may be provided by a first computer system 106. The network page 104 may include images or text of one or more items. In some examples, the network page 104 may not offer these items for sale, but provide information about the items, include journal or news articles that might incorporate the images, or other information.

A second computer system 108 may scan the network page 104 to identify the one or more items. The second computer system 108 may interact with a data store 110. The data store 110 may include additional information about items offered by the second computer system 108 In some examples, a user computing device 112 may also interact with the network page 104.

The process 100 may also identify an item identifier at 120. For example, the second computer system 108 may interact with the data store 110 to access the item identifier. The second computer system 108 can compare the image or text from the network page 104 with the data in the data store 110 to identify the item identifier. This data may include an image 122 of the item, model 124 (e.g., Acme Co. Model A or B, etc.), item descriptors or identifiers 126 (e.g., A100, B100, etc.), brand, logo, colors, a link 128 to a network page that offers the item for purchase (e.g., via an electronic marketplace associated with the computer system 108, "www.merchant.com/acmecomodela," etc.), or other information about the item. In some examples, the link 128 may direct the user to a local network page in association with the user's location (e.g., when the user is in India, the network page may be "www.merchant.in" instead of "www.merchant.com," etc.). Other types of information may be stored with the data store 110 without diverting from the scope of the disclosure.

The process 100 may also enable a link at the network page at 130. For example, the computer system 108 may access the network page 104 and add a data layer or hotspot 132 to the network page 104 to display the link on the network page 104. The link can provide access to the item identified with the data store 110 and offered for purchase by a merchant at the second webpage.

The data layer or hotspot 132 may be provided within a threshold distance from the image of the item on the network page 104. For example, the data layer or hotspot 132 may overlap text or images on the network page 104. In some examples, when the user hovers over the image of the item (e.g., a cursor overlaps an area corresponding with the image, the user selects the image by tapping the image via a touch screen on a user device, etc.), the link to the item offered at a second network page may appear. The user can access the item through the link.

Figure 2:
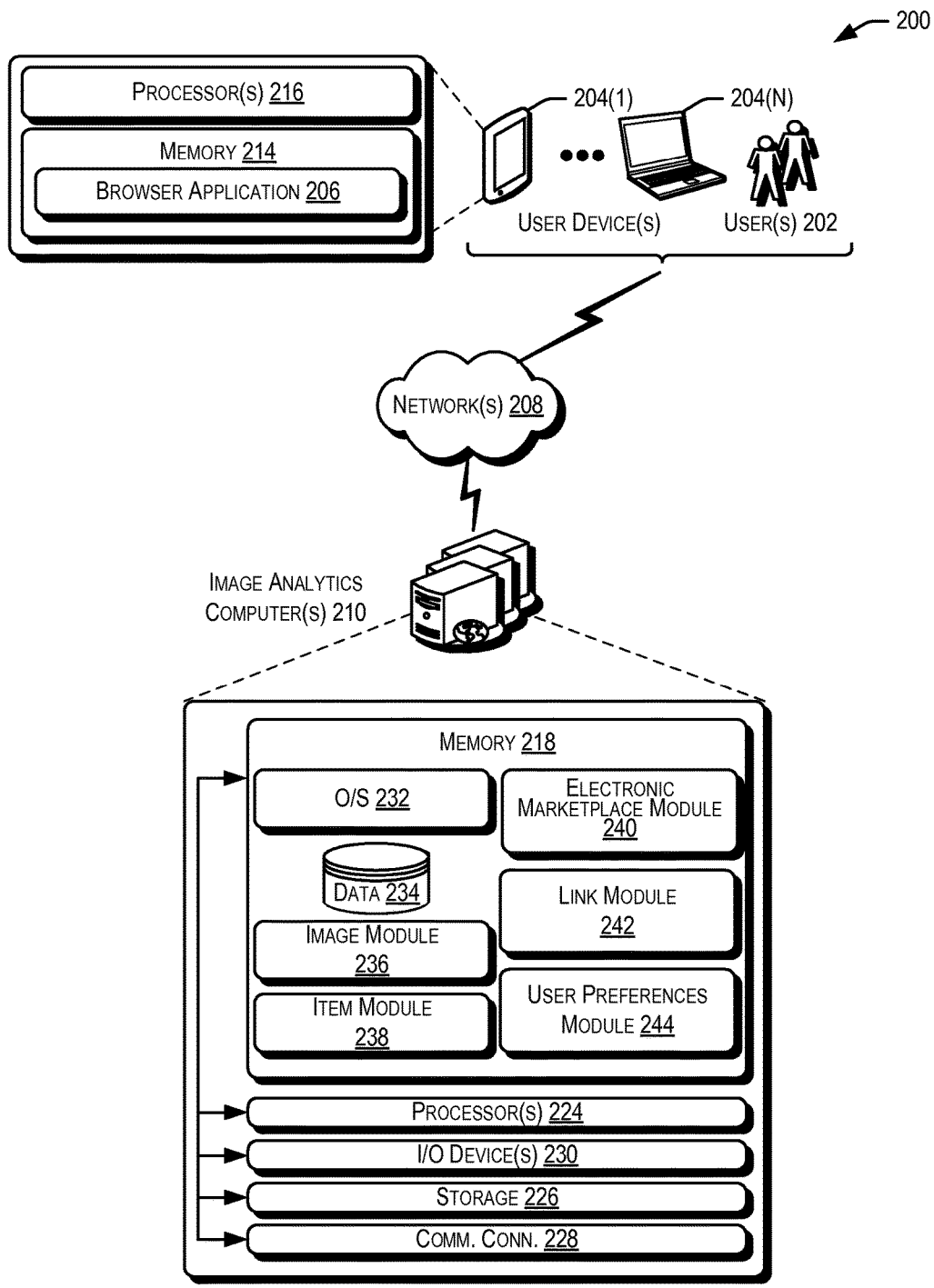
FIG. 2 illustrates an example architecture for providing shopping links to items described herein that includes an image analytics computer and/or a user device connected via one or more networks, according to at least one example.

FIG. 2 illustrates an example architecture for providing shopping links to items described herein that includes an image analytics computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more image analytics computers 210. The one or more image analytics computers 210 may, in some examples, provide computing resources such as, but not limited to, client entities, low latency data storage, durable data storage, data access, management, virtualization, cloud-based software solutions, electronic content performance management, etc. The one or more image analytics computers 210 may also be operable to provide web hosting, computer application development, and/or implementation platforms, combinations of the foregoing, or the like to the one or more users 202. The one or more image analytics computers 210, in some examples, may help provide a link to an item after analyzing an image of the item at a different source.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the image analytics computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more image analytics computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the image analytics computers 210 via the networks 208, or via other network connections. Additionally, the user devices 204 may be part of the distributed system managed by, controlled by, or otherwise part of the image analytics computers 210 (e.g., a console device integrated with the image analytics computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the image analytics computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the image analytics computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the image analytics computers 210 may be in communication with the user devices 204 and/or other service providers via the networks 208, or via other network connections. The image analytics computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the image analytics computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of image analytics computers 210, the memory 218 may be volatile (such as RAM) and/or non-volatile (such as ROM, flash memory, etc.). The image analytics computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the image analytics computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the image analytics computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The image analytics computers 210 may also contain communications connection(s) 228 that allow the image analytics computers 210 to communicate with a stored database, another computing device or server, user terminals, and/or other devices on the networks 208. The image analytics computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an image module 236, an item module 238, an electronic marketplace module 240, link module 242, and/or a user preferences module 244. The modules may be software modules, hardware modules, or a combination thereof. If the modules are software modules, the modules will be embodied on a computer readable medium and processed by a processor in any of computer systems described herein.

The image module 236 may be configured to receive, identify, or determine an image on a network page. The image may be identified by a selection of the image, receiving a link to the image on the network page, receiving a transmission of the image or copy of the image, scanning images on a webpage that a user accesses (e.g., automatically, through an opt-in or opt-out identification by the user, etc.), or other methods of identifying an image. The image module 236 may also be configured to compare an image or text from one network page to an image or text from another source to identify similarities (e.g., through image processing algorithms, comparing spatial relationships, color regions, or boundaries between the pixels in the image, etc.).

The item module 238 may be configured to identify an item attribute of an item. The item attribute may be identified based on text, images, data, or other information associated with a model number or type of item included with a network page. The item module 238 may also be configured to identify an item identifier based in part on an item logo, item color, and/or item attribute.

The electronic marketplace module 240 may be configured to offer for sale one or more items. The items may be displayed through individual network pages or combined network pages. When individual network pages are provided, a single item may be offered by a single merchant (e.g., from a plurality of merchants at an electronic marketplace, a direct link to an item, etc.). When combined, the network page may display one or more items offered by multiple merchants via the electronic marketplace. Similar items may also be offered on a combined network page, for example, to help enable cross-shopping and viewing competing items offered for purchase.

The link module 242 may be configured to generate and store a link to one or more items (e.g., the single network page, the combined network page, etc.). The link may be stored with the data store 234 and correspond with the item(s). The link module 242 may be configured to identify a link that is local to the user (e.g., "www..in" versus "www..com," etc.). The link module 242 may also be configured to generate a data layer or hotspot to display the link at the network page.

The user preferences module 244 may be configured to identify an opt-in or opt-out of the user. For example, the user may identify (e.g., through a profile, message transmission, automatically, etc.) that they do not want the image module 236 to automatically scan images on a network page that the user accesses. In another example, the user may specify the types of links to merchants that the user wants to receive (e.g., combined network pages, only merchants that are local to a particular area around the user, etc.).

Figure 3:
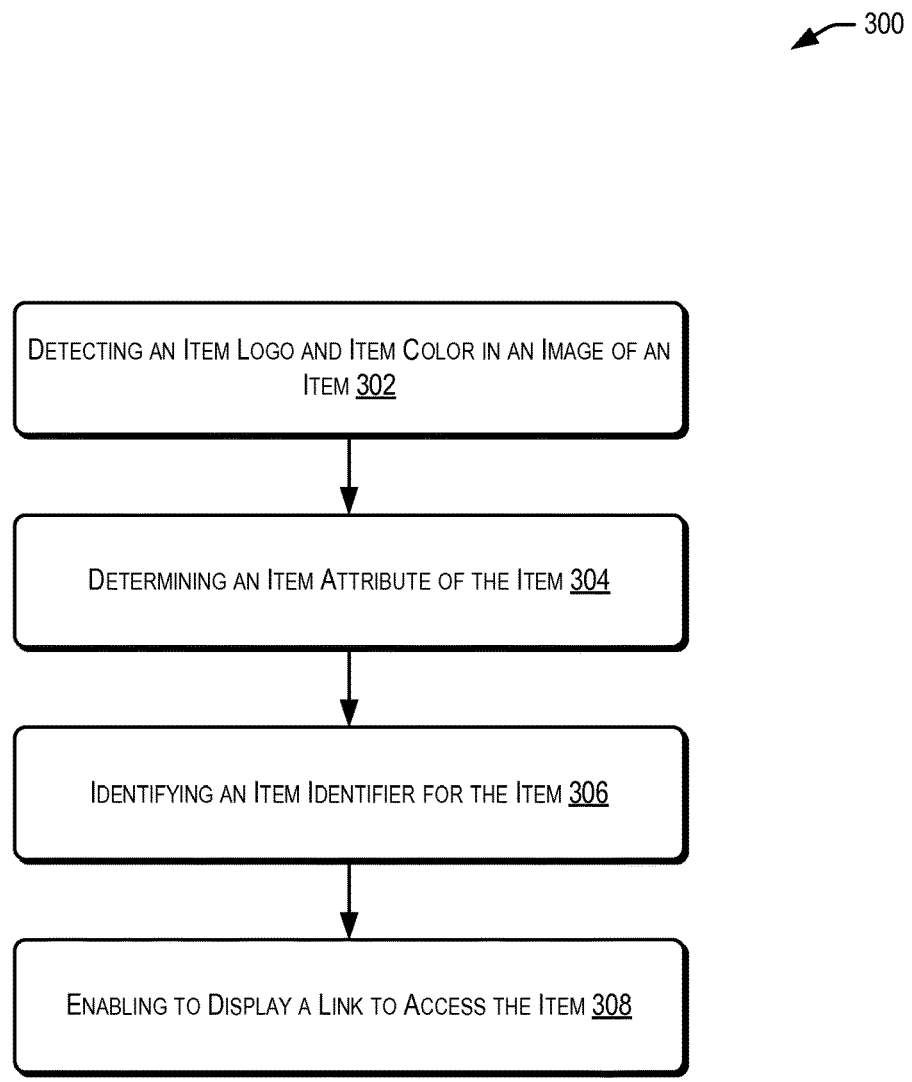
FIG. 3 illustrates an example flow diagram for providing shopping links to items described herein, according to at least one example.

FIG. 3 illustrates an example flow diagram for providing shopping links to items described herein, according to at least one example. In some examples, the one or more image analytics computers 210 (e.g., utilizing at least one of the image module 236, item module 238, electronic marketplace module 240, link module 242, and/or user preferences module 244) or one or more user devices 204 shown in FIG. 2 may perform the process 300 of FIG. 3.

Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 300 may begin at 302 by detecting an item logo and item color in an image of an item. For example, the image analytics computers 210 may detect, determine, receive, scan, analyze, reference, or otherwise access the image of the item. The item logo and item color may be detected in the image of the item as explained throughout the disclosure, including through comparing spatial relationships, color regions, boundaries between pixels in the image, and the like.

At 304, an item attribute of the item may be determined. For example, the image analytics computers 210 may determine the item attribute using data available through the network page (e.g., text descriptions, images of the item, etc.). In some examples, the item attribute may be associated with the model number or type of item included with the network page.

At 306, an item identifier for the item may be identified. For example, the image analytics computers 210 may access a data store of information about items. The information in the data store may be filtered (or otherwise organized) to help identify the item. The data about the items can include an image, text (e.g., model number, type of item, etc.), item identifier, and the like to help identify the item from the various items in the data store.

At 308, a link to access the item may be enabled to be displayed. For example, the image analytics computers 210 may receive or generate the link from a data store to display at a network page. The link may provide access to the item via the electronic marketplace. In some examples, a data layer or hotspot may be created around the image of the item at the network page (e.g., displayed within a threshold distance from the image, etc.). This may help correlate the data layer or hotspot with the image of the item.

Figure 4:
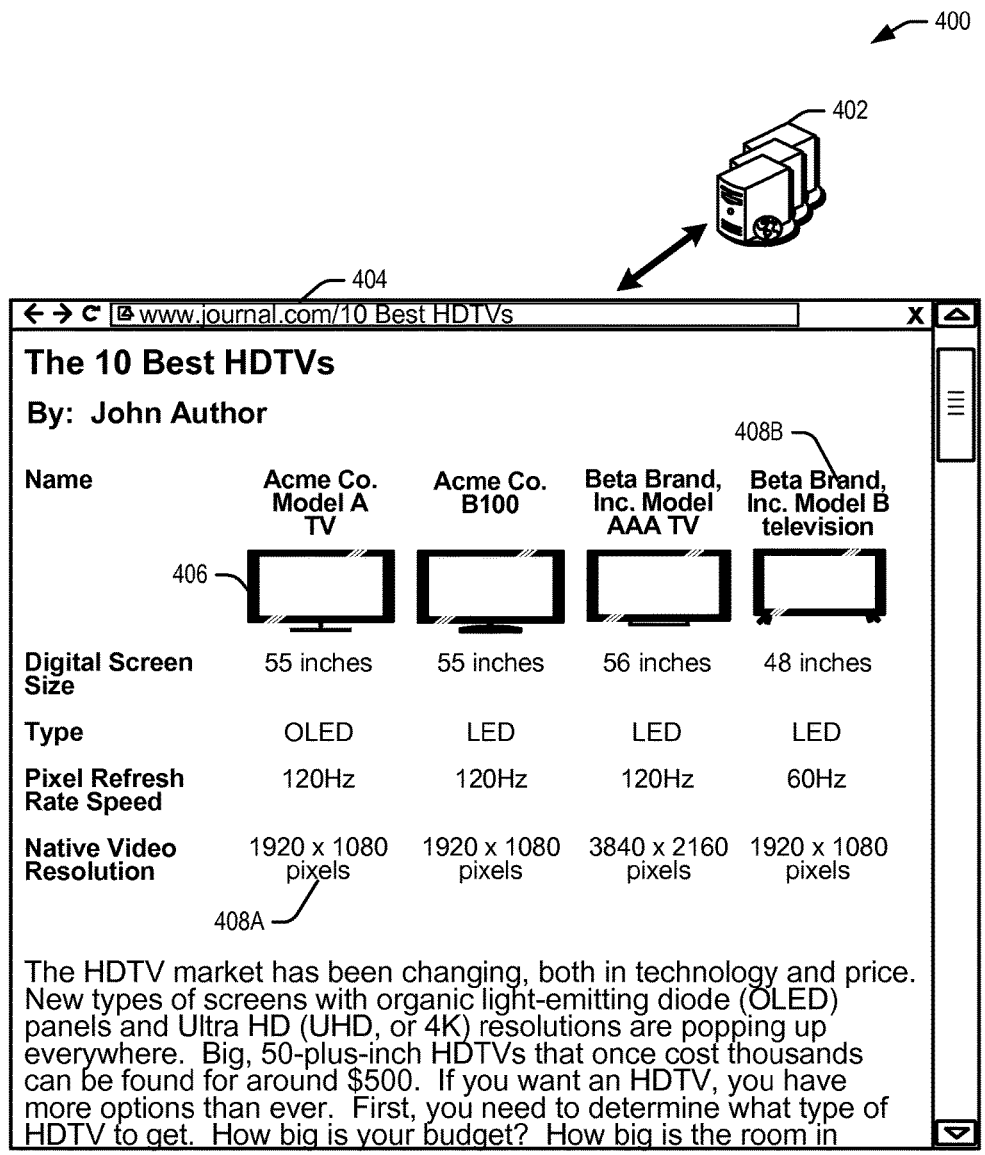
FIG. 4 illustrates an example of an image of an item on a network page described herein, according to at least one example.

FIG. 4 illustrates an example of an image of an item on a network page described herein, according to at least one example. In illustration 400, a computing device 402 interacts with one or more network pages, including network page 404. An example of the computing device 402 is illustrated in FIG. 2 as the image analytics computers 210. The computing device 402 may be associated with a merchant, plurality of merchants, or electronic marketplace. For example, a single merchant may offer one or more items through a merchant network page (e.g., different from network page 404). The merchant network page can display the one or more items as text and/or images, and offer users a method of ordering the item (e.g., adding the item to an electronic shopping cart, adding the item to a wish list of future purchases, etc.).

The computing device 402 may also be associated with a plurality of merchants or an electronic marketplace. In either example, many merchants may offer the same or different items through network pages. The network pages may include item attributes, descriptions, prices, a reference to a merchant that offers the item, or other information. The computing device 402 may also offer one or more combined network pages, as illustrated with FIG. 8.

The computing device 402 may interact with the network page 404. The network page 404 may not be directly associated with the computing device 402 and may be provided by a different computing device (not shown). The network page 404 can include a journal, blog, item review (e.g., an expert's opinion on an item, etc.), news aggregator webpage, images/information about a celebrity, an electronic marketplace that offers items for purchase from multiple merchants, or other information that may or may not offer items for purchase.

The network page 404 can include one or more images of items and text. The image 406 may display a pictorial representation of the item. The image may be presented in relation to the journal article (e.g., to help provide additional information about the topic of the journal article, to shown the item being discussed or compared, etc.), or other information provided in by the network page 404. As illustrated, the network page 404 can include an author's comparison of multiple televisions. The comparison may include the image 406 of one or more comparable items.

The network page 404 may also include data or text about the items. The data may include the name of the item, item descriptors or identifiers, brand, logo, colors, or other information about the item. As illustrated, the data may be presented in relation to the journal article or other information provided by the network page 404.

The computing device 402 (e.g., which may be different from a different computing device that provides the network page 404) may receive the data from the network page 404 using a variety of methods. For example, to receive image data, the computing device 402 may scan the network page 404 using an image recognition algorithm, pattern or gradient recognition, data scanning, or other methods of identifying an image from a remote source, as discussed with FIG. 12.

One or more of the identified images on the network page may be received as image data (e.g., delineated by a box around the image, detecting non-character-type features displayed on the network page, etc.). In another example, the computing device 402 may scan the textual definition of the network page (e.g., computer code in HTML, etc.) to identify terms that specify an image on the network page (e.g., "img src," ".jpg," etc.).

The computing device 402 may also receive the text data from the network page 404 using a variety of methods. For example, to receive text data, the computing device 402 may scan the network page 404 using an optical character recognition (OCR) algorithm, data scanning, or other methods of identifying text from a remote source. One or more of the identified text strings on the network page may be received as text data.

The computing device 402 may determine an item attribute 408A, 408B. For example, the data on the network page (e.g., image or text data, etc.) can be parsed to determine the one or more item attributes 408A, 408B. As a sample illustration, the item may be a television and the item attribute 408A, 408B may include a model number (e.g., Model A TV, B100, Model AAA TV, Model B television, etc.), brand (e.g., Acme Co., Beta Brand, etc.), digital screen size (e.g., 55 inches, 56 inches, 48 inches, etc.), type (e.g., OLED, LED, etc.), pixel refresh rate speed (e.g., 120 Hz, 60 Hz, etc.), native video resolution (e.g., 1920×1080 pixels, 3840×2160 pixels, etc.), or other information. The item attribute may also be identified from a text string that is not associated with a label or other identifier (e.g., "The HDTV market has been changing, both in technology and price. New types of screens with organic light-emitting diode (OLED) panels and Ultra HD (UHD, or 4K) resolutions are popping up everywhere," which identifies HDTVs, at television type, etc.).

Parsing may help identify the item attribute. For example, the computing device 402 may parse the text string to determine the one or more verbs, nouns, and/or pronouns in the text string. In some examples, the computing device 402 may analyze the text string using natural language processing to determine the key words that associate with item attributes (e.g., "pixels" or "HDTV," etc.).

Figure 5:
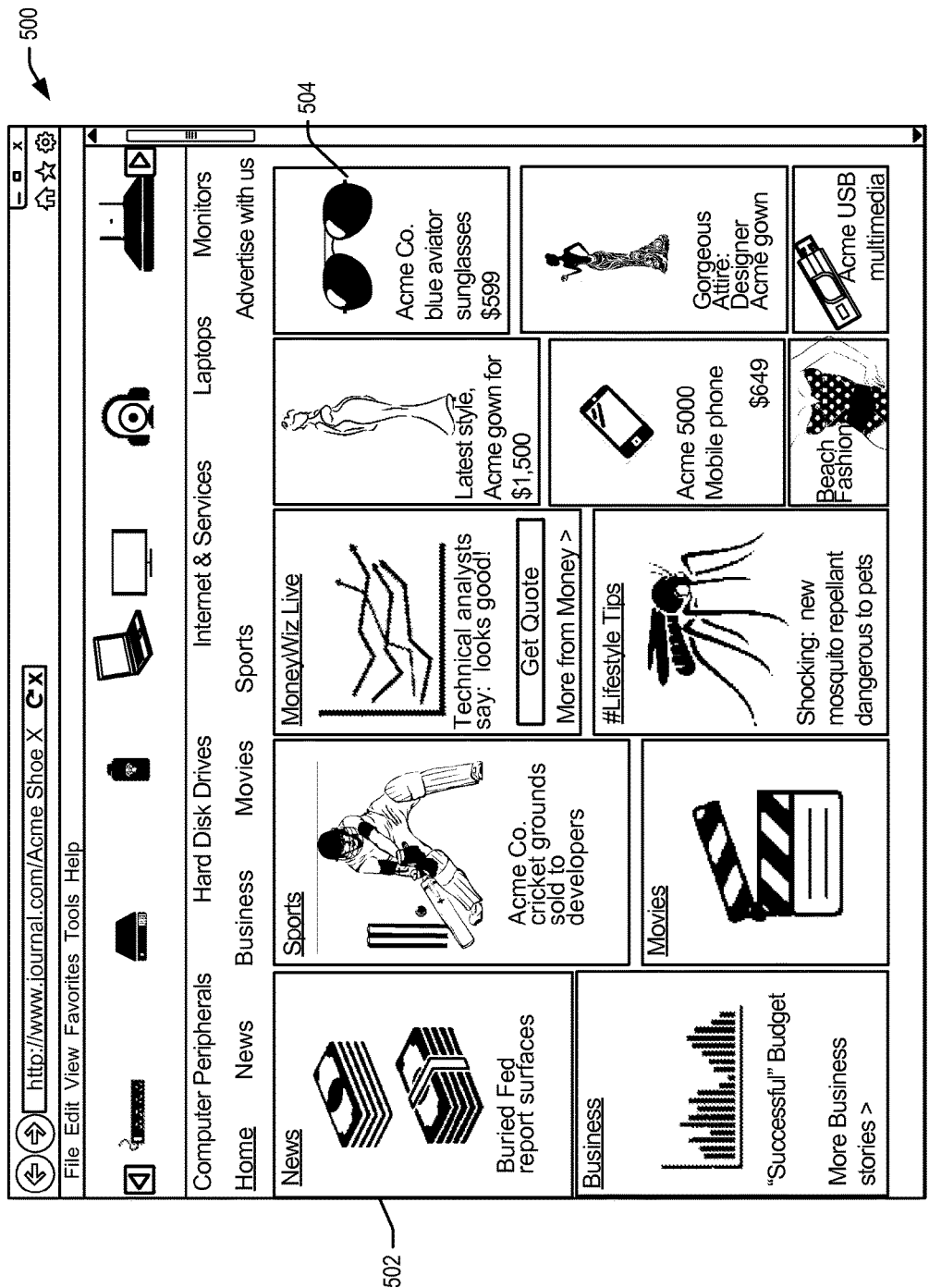
FIG. 5 illustrates an example of an image of an item on a network page described herein, according to at least one example.

Another example of an image of an item on a network page is provided with FIG. 5. FIG. 5 illustrates an example of an image of an item on a network page described herein, according to at least one example. In illustration 500, a computing device (not shown) interacts with a network page 502. An example of the computing device is illustrated in FIG. 2 as the image analytics computers 210.

The network page 502 may aggregate a plurality of news sources, advertisements, journal articles, and other sources of information on one or more scrolling network pages. The computing device may scan the network page 502 to identify the plurality of images and text displayed by the network page 502 in order to identify at least one image of an item 504. Similarly with FIG. 4, this and other data may be identified as an item attribute, item model, and the like.

Figure 6:
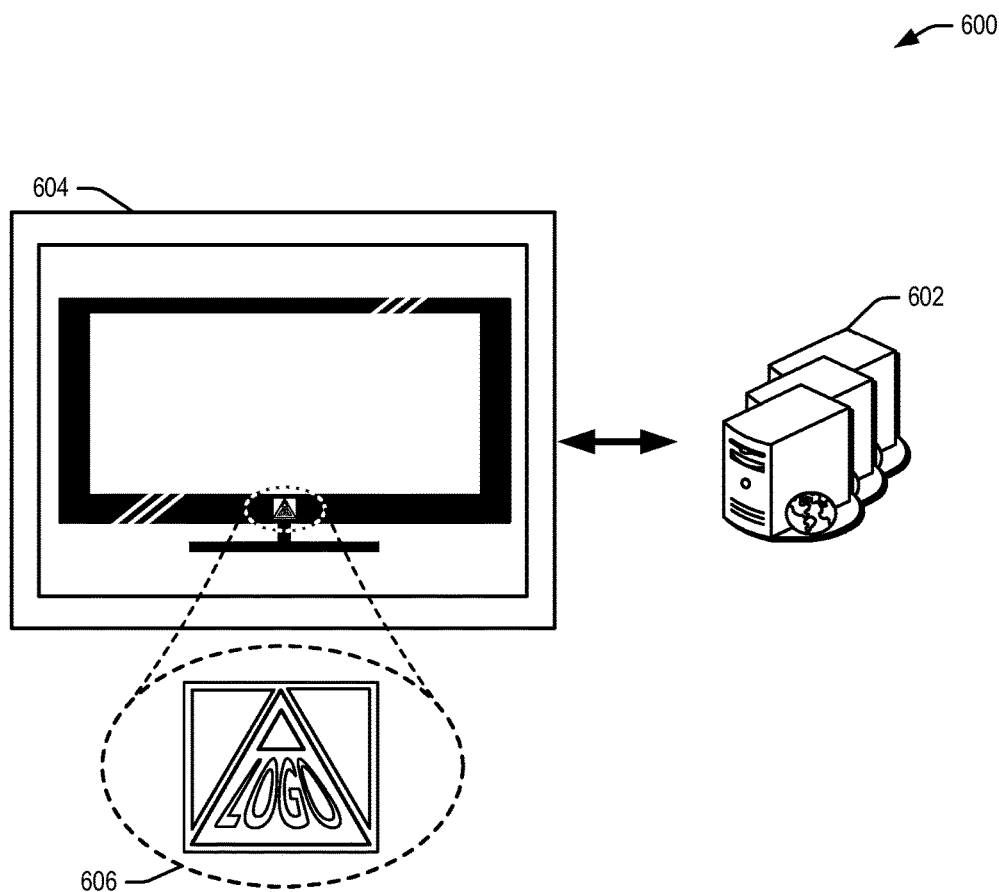
FIG. 6 illustrates an example of determining an item attribute described herein, according to at least one example.

FIG. 6 illustrates an example of determining an item attribute described herein, according to at least one example. In illustration 600, a computing device 602 receives or identifies an image 604, the image portion 606 including an item logo and/or item color image. An example of the computing device 602 is illustrated in FIG. 2 as the image analytics computers 210. In some examples, the computing device 602 may be implemented as a user device, where the analysis of the image 604 is performed at the device operated by the user (e.g., receiving an image, scanning the image, identifying an item, etc.).

The computing device 602 may analyze the image 604 to identify one or more portions of the image. For example, the image portion 606 may correspond with color changes between pixels within a threshold distance from each other.

In some examples, the regions may correspond with points of interest throughout the image, including letters, symbols, pictures, designs, or other notable aspects of the image 604. Other methods of identifying image portions may be implemented as well (e.g., gradient or boundary analysis, etc.).

The computing device 602 may identify the item attribute using image or text information. For example, the item attribute may be determined by analyzing and/or receiving text from the network page that identifies the model number or the type of item in the text (e.g., in an item description, etc.).

In some examples, the computing device 602 may scan the image 604 and identify a change in pixels within a threshold distance (e.g., five pixels, twenty pixels, etc.). This color change may identify a point of interest, including a logo or brand of the item displayed on the front of the television in the image. The logo or brand of the item may be identified as an image portion 606.

In some examples, the change in pixels within a threshold distance can identify a color of the item in the image. For example, the computing device 602 may receive the image of the item, detect dimensions of the item logo (e.g., based in part on the identified point of interest or image portion, etc.), and expand the image dimensions of the area to be evaluated around the item logo by an image threshold to include additional pixels close to the item logo. This may help identify the color of the item when the item logo is a different color from the rest of the item (e.g., in order for the item logo to stand out from the color of the item, etc.). In another example, the computing device 602 may detect a dimension of the item logo, analyze an image dimension that is greater than the dimension of the logo to capture a portion of the item adjacent to the logo, and determine the color of the portion of the item. The image threshold (e.g., 5% of the image, 5-10 pixels around the image, etc.) may limit the colors identified around the image logo, for example, when the item includes a pattern or multiple colors.

The image portion 606 may be stored in a data store or scanned and discarded by the computing device 602. In some examples, the image portion 606 may be received by the computing device 602 (e.g., after scanning the network page), stored for a threshold amount of time (e.g., one-day, one-month, etc.), and cleared after the threshold of time expires.

In some examples, the computing device 602 may compare the image portion 606 with the logo stored in a data store of image portions (e.g., or access the image portion in a temporary cache or queue without also storing the image portion). The data store can include known logos, trademark colors (e.g. TIFFANY blue, UNITED PARCEL SERVICE (UPS) brown, etc.), brand names, or other information. The computing device 602 can compare the identified portions from the image 604 with the data store of image portions to identify a match or similarity between the two sources. For example, when image 604 includes an image portion that is similar to a trademarked logo from Acme Co., the item that corresponds with the image 604 may be an item manufactured by Acme Co.

Figure 7:
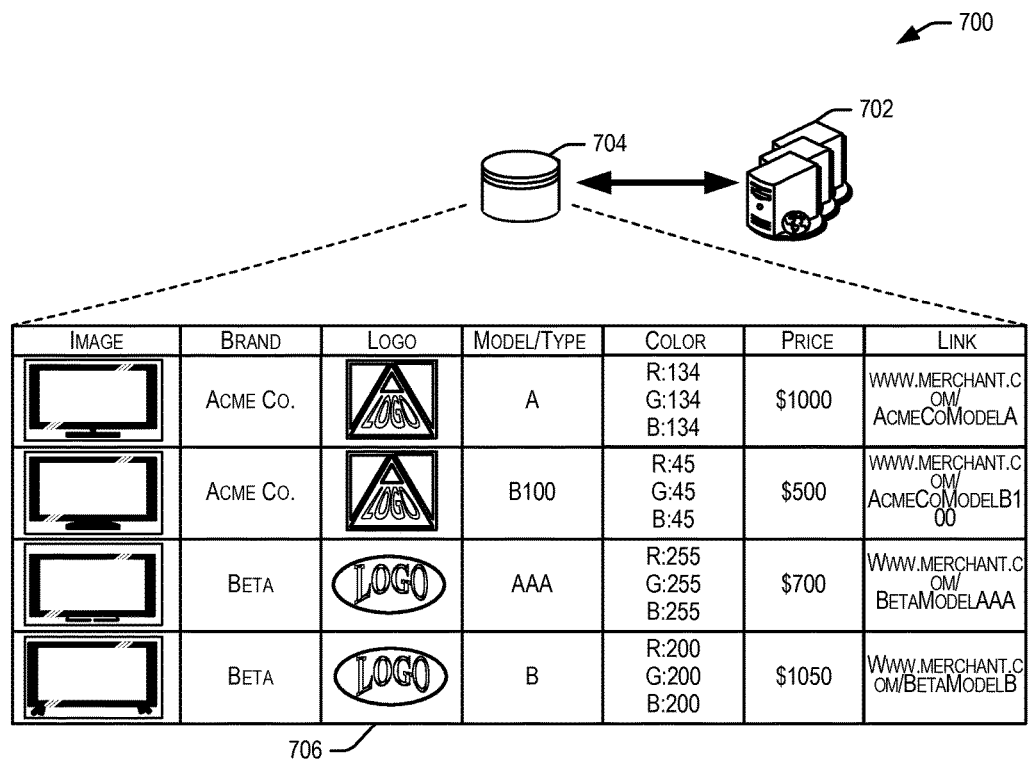
FIG. 7 illustrates an example of identifying an item identifier described herein, according to at least one example.

FIG. 7 illustrates an example of identifying an item identifier described herein, according to at least one example. In illustration 700, a computing device 702 interacts with a data store 704 to access information about items. Examples of the computing device 702 and data store 704 are illustrated in FIG. 2 as the image analytics computers 210 and data store 234, respectively.

The data store 704 may include information about items offered for sale with a second computing device that may not be associated with the first computing device that provided the network page for the journal article. The information in the data store 704 may also include one or more images associated with the item (e.g., images from a front angle, side angle, top angle, etc.), brand, logo, model or type, color, price, link to a merchant or electronic marketplace that offers the item, or other information.

The items in the data store 704 may be filtered based in part on the comparison between the image portions illustrated in FIG. 6 and the data stored in the data store 704, illustrated in FIG. 7. When an item fails to correspond with the image portions, the item may be filtered from the comparison.

In some examples, a subset of items may be identified based in part on the comparison. For example, a subset of items may include items that match a brand and logo, but not the color. In some examples, the subset of items may include items that match a type (e.g., television, clothing, etc.), but not a logo (e.g., the logo may be hidden in the image or not mentioned by the journal article on the network page, etc.). The link to a particular item or subset of items may be returned to the first network page, as illustrated with FIG. 9.

In some examples, the data store 704 may include an item identifier that specifies a particular item offered by one or more merchants. The merchant may provide the item directly through a merchant network page, or through an electronic marketplace that provides a plurality of merchant network pages that can each offer similar versions of the item.

In some examples, the item identifier may include a network page that includes multiple links to multiple items (e.g., a combined network page). The single network page can include links to other network pages associated with the merchant, but provided through the electronic marketplace. An example of the combined network page that includes multiple links to multiple items is provided with FIG. 8.

Figure 8:
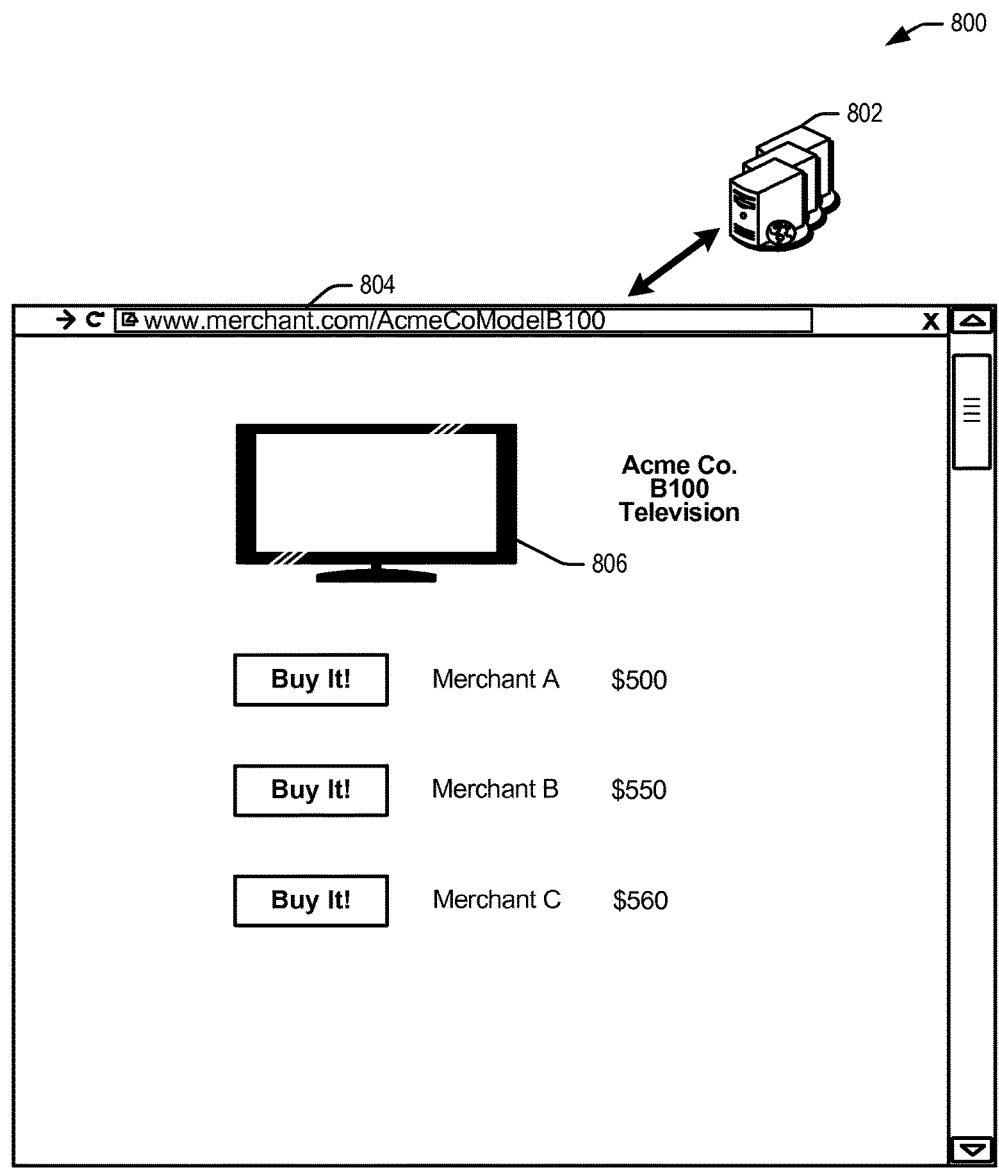
FIG. 8 illustrates an example of an electronic marketplace described herein, according to at least one example.

FIG. 8 illustrates an example of an electronic marketplace described herein, according to at least one example. In illustration 800, a computing device 802 interacts with a network page 804. The network page 804 may correspond with an electronic marketplace or other function related to the computing device 802. An example of the computing device 802 is illustrated in FIG. 2 as the image analytics computers 210.

The address of the network page 804 may correspond with the link stored in the data store, as illustrated in FIG. 7. In some examples, the link may correspond with a particular item 806 offered by one or more merchants and/or the location of the user device. As illustrated, the item 806 (e.g., the image referencing the item available for sale from a merchant, etc.) may include "Acme Co. B100 Television" and data that corresponds with the item (e.g., image of the item, description as "television," model number as "B100," price, etc.). The network page 804 can include one or more merchants that offer the item (e.g., through the electronic marketplace).

The location of the user may be determined using multiple methods. For example, a location of a user may be identified by the location of the user device (e.g., geolocation, internet protocol (IP) address, media access control (MAC) address, user-identified location, etc.). In another example, the location of a user may be identified by the locations that the user has shown interest in when operating the user device (e.g., the initial network page is associated with a particular location, so the user may also be associated with that location). As a sample illustration, a user device may be associated with an IP address uniquely assigned by the Internet Service Provider (ISP) when the user device connects to the network. During the connection, the IP address may be identified to determine the location of the user device. Other methods of location identification may be used as well, including global positioning system (GPS), cellular identifier information, Wi-Fi, and the like.

The link may correspond with the location. For example, the computing device 802 may identify the geolocation associated with an IP address of the user device. When the geolocation corresponds with a particular country (e.g., IP address "38.100.0.0" corresponds with United States, etc.), the link may identified to correspond with that location (e.g., "*.com" instead of "*.in").

In some examples, the link may correspond with multiple items offered by one or more merchants (not shown). This may be similar to a generic search network page that provides search results to a search query. The network page may display the similar items (e.g., that correspond with the subset of items or filtered items from the data store 704, etc.) and/or merchants that offer the items (e.g., through the electronic marketplace, etc.).

The electronic marketplace may include a plurality of merchants selling the item 806. Multiple electronic marketplaces are available, where each electronic marketplace may offer items for purchase from multiple merchants. The plurality of merchants may also sell other items (e.g., other than item 806) via the electronic marketplace. In some examples, the electronic marketplace may be associated with an individual network page for an item or combined network pages. When combined, similar items may be offered on a combined network page, for example, to help enable cross-shopping and viewing competing items offered for purchase.

Figure 9:
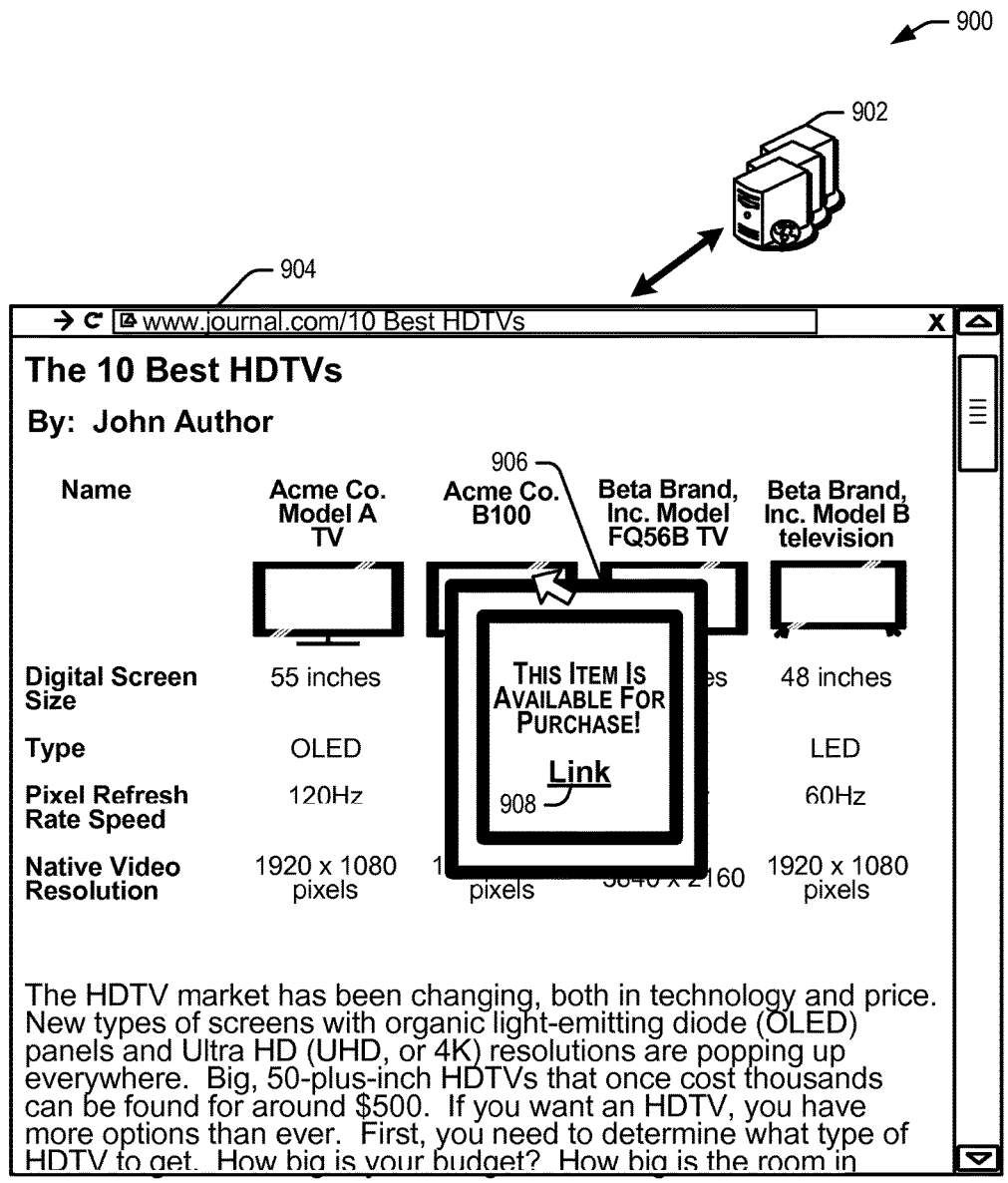
FIG. 9 illustrates an example of providing a link described herein, according to at least one example.

FIG. 9 illustrates an example of providing a link described herein, according to at least one example. In illustration 900, a computing device 902 interacts with a network page 904. An example of the computing device 902 is illustrated in FIG. 2 as the image analytics computers 210 and in FIG. 4 as the computing device 402. In some examples, network page 904 in FIG. 9 may be the same network page as identified in FIG. 4 as network page 404.

As illustrated, the computing device 902 identified an image from the network page 904 (e.g., as described with FIG. 4) and provided a data layer or hotspot 906 to correspond with the image. For example, a data layer or hotspot 906 include one or more selectable areas, which can function like a link from the image to a second location. The data layer or hotspot 906 may be a rectangular, circular or polygonal-shape and/or may overlap the data presented by the network page 904.

When the user hovers over the data layer or hotspot 906 (e.g., associated with item "Acme Co. B100"), a pop-up window may be activated (e.g., a graphical user interface (GUI) that appears in the foreground of the network page 904, etc.). In some examples, the pop-up window may overlap the image or be enabled to be displayed within a threshold distance from the image (e.g., in the upper or lower corners of the image, so that the image is not completely covered with the pop-up window appears, etc.). In some examples, the pop-up window does not overlap text displayed by the network page.

The pop-up window may include a link 908. The link 908 may be embedded in the pop-up window. When the user activates the link from the pop-up window, the user may be redirected to the location that corresponds with the link (e.g., as illustrated in FIG. 8 or the second network page 804 provided by the computing device 802).

In some examples, information on the network page 904 may be altered. For example, the journal article or other information displayed by the network page 904 may be lightened or otherwise adjusted so that the focus on the pop-up window is highlighted. In some examples, the network page 904 is unaltered and the data layer or hotspot 906 exists on top of the content of the network page 904 (e.g., in a transparent layer, in a layer that blocks data in the background, etc.).

The data layer or hotspot 906 may be provided to the network page 904 using various methods. For example, the computing device 902 can control (at least in part) the user application (e.g., application 206, a web browser, etc.) in order to alter the network page and include the data layer or hotspot 906. In some examples, the computing device 902 may provide the user device and/or user application. In a sample illustration, the computing device 902 may receive code associated with the network page (e.g., the hypertext markup language (HTML) and/or other code language that helps define the information provided on the network page 904). The computing device 902 may change, add, or otherwise adjust the received code. For example, additional code may be added to the original HTML code to instruct the network page 904 to display the data layer or hotspot 906. The adjusted code may enable to display the link (e.g., associated with the data layer or hotspot 906) at the network page. The computing device 902 may then provide the adjusted code to the user device, which displays the data layer or hotspot 906 at the network page 904 (e.g., the original source of the data that is not controlled by the computing device 902). By controlling (at least in part) the user application, the computing device 902 can enable to display the link at the network page 904.

In another example, the computing device 902 may interact with a third party computer and/or redirect service (e.g., not the original host of the network page 904). For example, the user device may access the network page 904 through the third party computer and/or redirect service. The computing device 902 may also interact with the network page 904 through the third party and/or redirect service. The computing device 902 may instruct the third party computer and/or redirect service to adjust the received code (as explained herein) to add the data layer or hotspot 906 to the code associated with the network page 904. Then, when the user device accesses the network page 904, the user device may access the network page 904 provided by the third party computer and/or redirect service, which has been adjusted in part by the computing device 902. By interacting with the third party computer and/or redirect service, the computing device 902 can enable to display the link at the network page 904.

Figure 10:
FIG. 10 illustrates an example of an image of an item on a network page described herein, according to at least one example.

FIG. 10 illustrates an example of an image of an item on a network page described herein, according to at least one example. In illustration 1000, a computing device (not shown) interacts with a network page. An example of the computing device is illustrated in FIG. 2 as the image analytics computers 210.

In some examples, the image may be identified from a network page associated with a merchant. As a sample illustration, the merchant may provide a network page for a celebrity athlete. The network page can include one or more items associated with the celebrity athlete, including items from a sponsor that monetarily supports the athlete in exchange for the athlete's approval to wear items from the sponsor.

A computing device (not shown) may scan or otherwise identify the items on the network page associated with the celebrity athlete. For example, the computing device may detect an image of an item on a network page and determine an item attribute of the item by using data available through the network page. As illustrated, the computing device may identify the image of the item, the description of the item (e.g., or other text corresponding with the image of the item included with the network page), or other information that may help identify an item attribute associated with the item.

The computing device can identify an item identifier for the item by accessing a data store of information about items (e.g., as illustrated with FIG. 7). One or more of the items may correspond with an item identifier, and the data in the data store can correspond with an electronic marketplace that is separate from the network page. For example, the network page in FIG. 10 may be provided by a computing device for the athlete's sponsor and the computing device that identifies the item identifier may correspond with an electronic marketplace. The identifying may be based in part on the item attribute and the text corresponding with the image of the item, as illustrated throughout the disclosure.

The computing device associated with the electronic marketplace can enable to display a link at the network page provided by the athlete's sponsor. The link can provide access to a plurality of merchants that offer the item via the electronic marketplace. In some examples, the user may be redirected to a second network page, as illustrated with FIG. 11.

Figure 11:
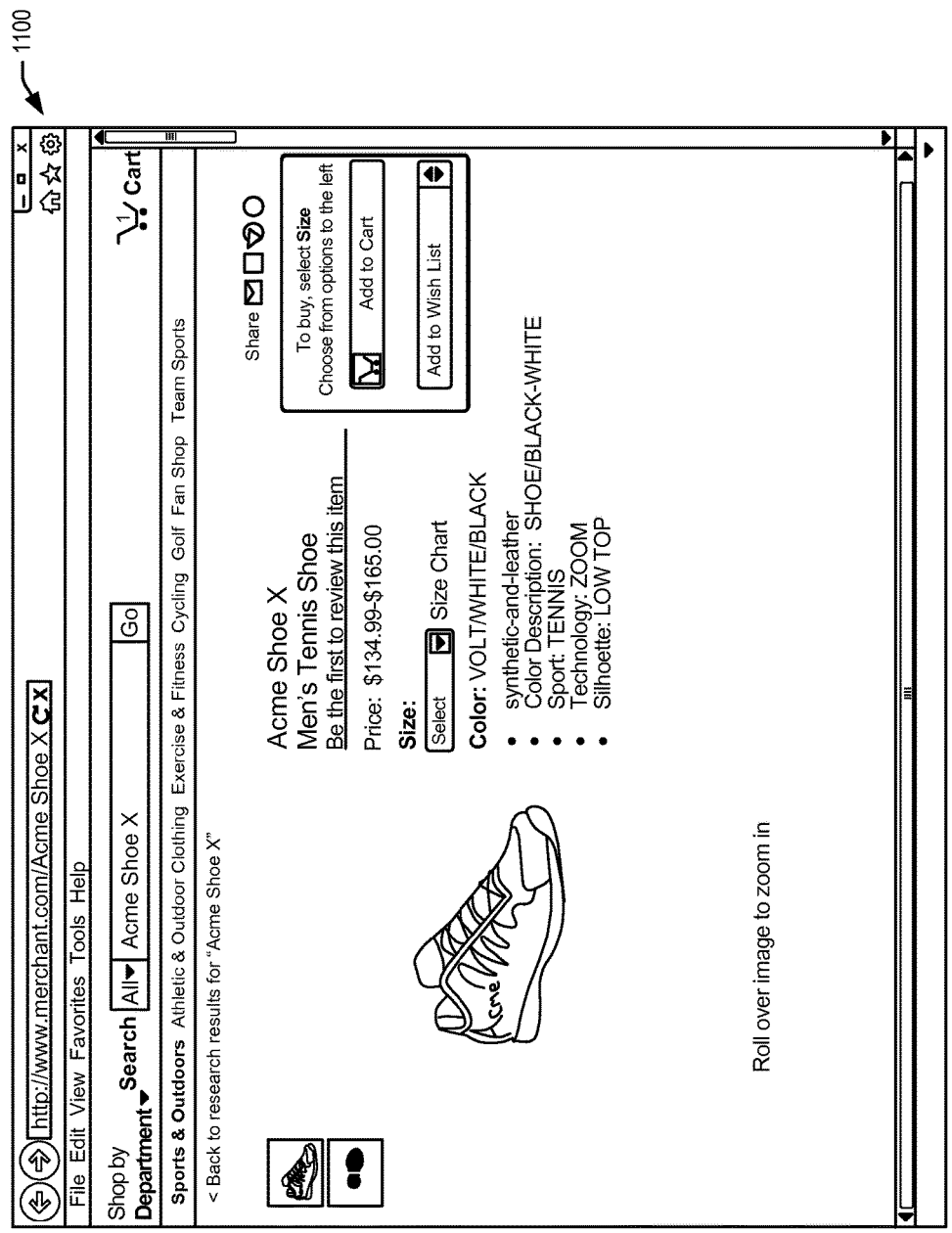
FIG. 11 illustrates an example of an electronic marketplace described herein, according to at least one example.

FIG. 11 illustrates an example of an electronic marketplace described herein, according to at least one example. In illustration 1100, a computing device (not shown) interacts with a network page. An example of the computing device is illustrated in FIG. 2 as the image analytics computers 210. The network page can include an offer to purchase the item. The item may correspond with one or more of the items displayed in FIG. 10, but include an offer for sale from a different merchant (e.g., through the electronic marketplace).

Figure 12:
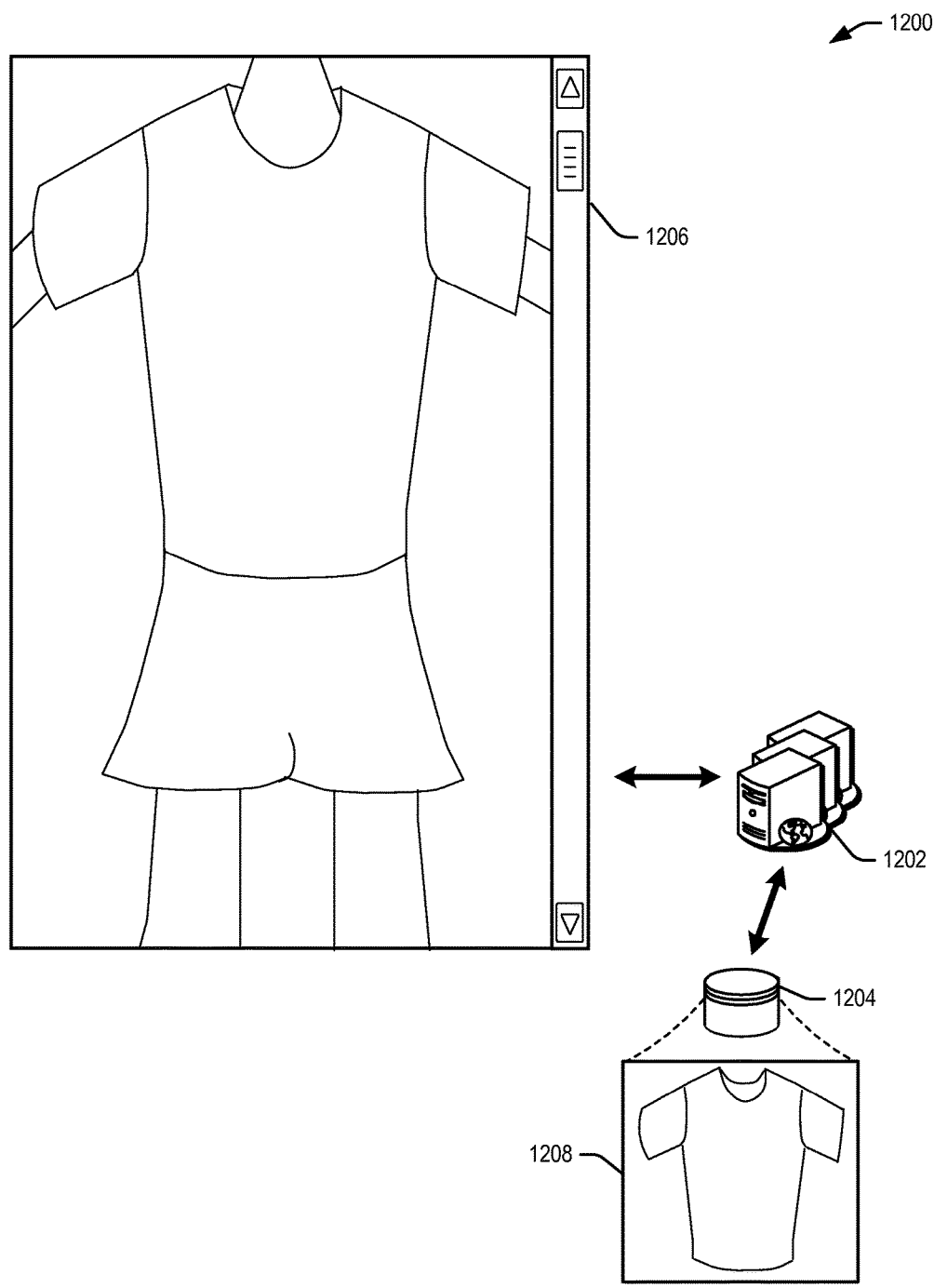
FIG. 12 illustrates an example of an image of an item on a network page described herein, according to at least one example.

FIG. 12 illustrates an example of an image of an item on a network page described herein, according to at least one example. In illustration 1200, a computing device 1202 interacts with a data store 1204 and the network page 1206. Examples of the computing device 1202 and data store 1204 are illustrated in FIG. 2 as the image analytics computers 210 and data store 234, respectively.

The image of the item may be a link to the image displayed on the network page 1206, an image file corresponding with the image, transmitted to the electronic marketplace, a temporary identification of the image through a scan of the network page 1206, or other means of identifying an image. The image of the item may be identified as a portion of another image (e.g., the image displayed on a network page 1206). For example, the image may include a person wearing the item. The item may be partially covered in the image (e.g., as layered clothing items, as partially covered by the person's arm, etc.). In some examples, the image may include multiple items, including a celebrity wearing a shirt, shorts, and hat in the image. The shirt, shorts, and hat may be separate items displayed in a single image.

The computing device 1202 may receive an identification of the image on the network page. For example, the computing device 1202 be notified of the image when the image is activated (e.g., when a user clicks or selects the image, when the image is shown within a viewable area on a screen of a user computing device, etc.). A link to the image or copy of the image may be transmitted to the computing device 1202. The identification of the image may include the link, an item description of the image (e.g., text that accompanies the image, etc.), or other information associated with the image that can include the image's identification.

The computing device 1202 may detect image portions in the image. The image portions may correspond with a first and second item (e.g., the shirt and the shorts worn by the celebrity). The computing device 1202 may parse or segment the items in the image into individual images of items, including a separate image for the shirt, the shorts, and the hat. The item(s) may be detected using various methods described throughout the disclosure, including an image recognition algorithm, pattern or gradient recognition, data scanning, or other methods of identifying an image from pixels.

The computing device 1202 may compare spatial relationships between portions of the image (e.g., one item's location in space in relation to a second item). As a sample illustration, the computing device 1202 may identify a shirt in an image. The spatial relationship in association with the shirt also help identify arms (e.g., from the left and right of the shirt), a neck (e.g., above the shirt), and a pair of shorts (e.g., below the shirt). The expectation of the spatial relationship of other items in the image (e.g., the pair of shorts) may help narrow the subset of items available for identification from the data store (e.g., for more efficient processing). Once the spatial relationships are identified in the image, a subset of pixels in the image may be determined that correspond with the first item (e.g., based in part on the comparison of the spatial relationships, etc.).

The computing device 1202 may detect item(s) using color regions. As a sample illustration, the computing device 1202 may identify a value (e.g., red, green, blue (RGB), grayscale, etc.) in the image. The computing device 1202 may assume that adjacent pixels whose value is within a certain color or texture range (e.g., within an image threshold) belong to the same item or image portion. When portions of the image are outside of the threshold, those portions of the image may be parsed or segmented as different items in the single image.

Once the color region is identified in the image, a subset of pixels may be determined that correspond with the color region (e.g., pixels corresponding with the shirt in the image). The subset of pixels may be compared with the images of items in the data store associated with the electronic marketplace. The computing device 1202 may determine that, based in part on the comparison that the subset of pixels corresponds with at least one image from the data store (e.g., the shirt, etc.).

The computing device 1202 may detect item(s) and/or image portions using boundary analysis. As a sample illustration, the computing device 1202 may identify a value (e.g., red, green, blue (RGB), grayscale, etc.) of one or more pixels in the image. The computing device 1202 can compare the one or more values with values from different pixels in the image (e.g., the different pixels can be within a threshold distance of the one or more pixels, adjacent to the one or more pixels, etc.). The computing device 1202 may assume that pixel values change above a threshold at the boundary of the item in the image. For example, the middle of a shirt may be associated with a somewhat similar color throughout, but the edges of the shirt may be associated with a darker color, due to shadows and different texture values of the item in the image. The boundary analysis may detect the boundary of the item(s) in the image, which can correspond with the outline of the first, second, etc. items in the image. When the one or more pixels and different pixels are within a threshold value at the boundary of the item(s) in the image, the separate items may be identified.

The computing device 1202 may identify and analyze the image remotely from the computing device (e.g., dynamically as the computing device is scanning the network page, etc.). In some examples, the image portions may be transmitted to the computing device to be analyzed locally at the computing device. Other methods of identifying the image may be implemented as well, without diverting from the essence of the disclosure.

The computing device 1202 may access a data store 1204. The data store 1204 can include multiple view angles of images of items (e.g., an image of a shirt head-on, to the left, to the right, an image of a hat from multiple angles, etc.). The database can correlate one or more of the multiple view angles with a single item that is for sale via a link through the electronic marketplace or other network page. The database might also include the name of the item, item identifier, merchants that sell the item, link to a sale page that sells the item, etc.

The computing device 1202 may compare the detected items in the source image (e.g., corresponding to the image portions displayed on a network page 1206) with the images in the data store. For example, the image angle from the image of the celebrity may be compared with the front image, side image, or other angles of the same item. Multiple images from a single item may be compared with multiple image portions from the original image as well.

If the computing device 1202 finds a match with one of the images in the data store 1204, the computing device 1202 can access the link to the sale network page of the item 1208 stored in the data store 1204. The match may be a fuzzy match, because the celebrity's arm may hide part of the shirt, which would remove part of the image of the shirt from the comparison (e.g., match 75% or higher, etc.). In some examples, the computing device 1202 may estimate the dimensions of the item that are hidden, or temporarily remove or hide those same portions from the image analysis. The correlation of the missing image information may help the computing device 1202 identify a closer match between the image portions and the stored data.

The computing device 1202 may identify and/or return the link to the network page 1206. The link may be enabled to be displayed at the network page (e.g., by a different coming device than the computing device that provided the link). The link may be displayed within a threshold distance from the detected first item on the network page.

The computing device 1202 may generate a hotspot around the item on the network page 1206. The hotspot may display a pop-up window when the hotspot is activated (e.g., clicked, tapped, etc.). In some examples, the hotspot may correspond with the parsed area identified around the item (e.g., within ten pixels around the outline of the shirt, overlapping the entire image or image portion that corresponds with the shirt, etc.).

Illustrative methods and systems for providing shopping links to items are described above. Some or all of these systems and methods may, but need not, be implemented at least partially by architectures such as those shown at least in FIGS. 1-12 above.

Figure 13:
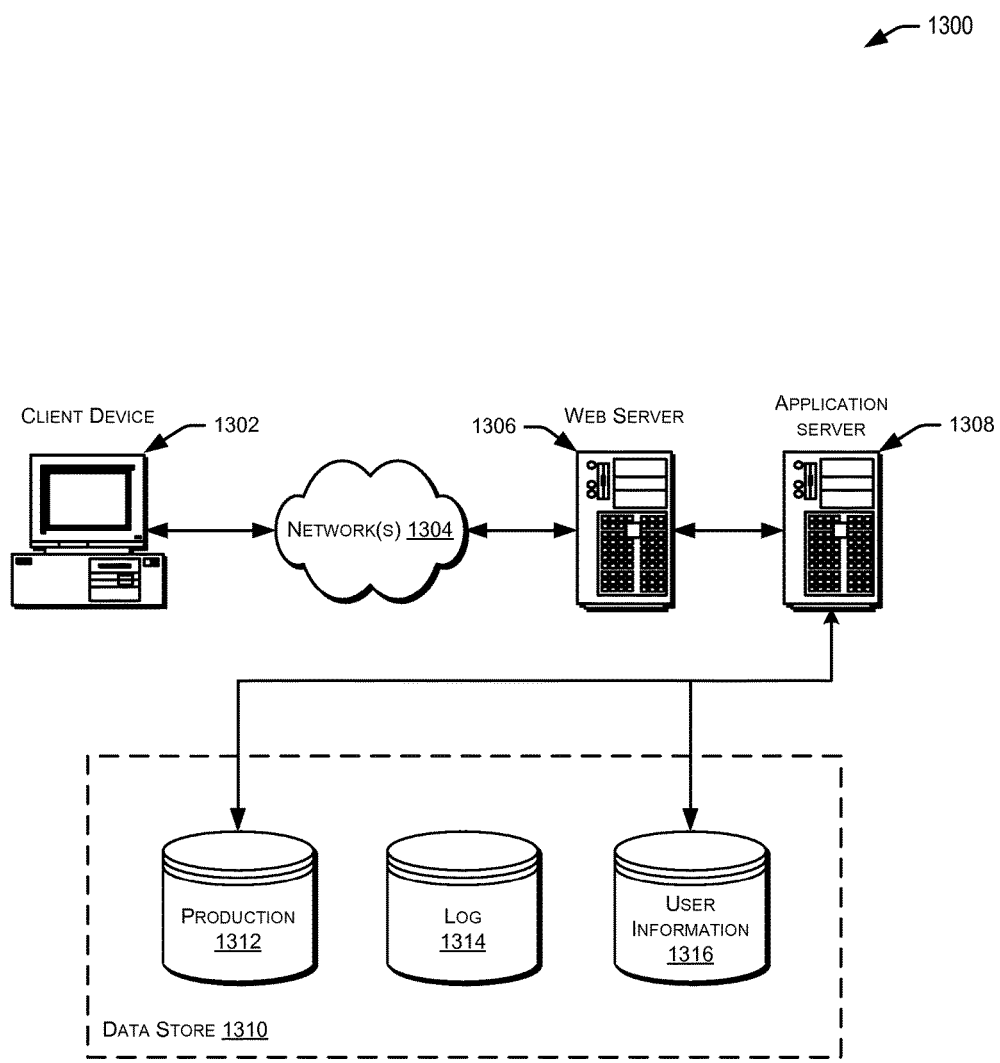
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of Hypertext Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more computer-readable storage media collectively storing computer-executable instructions that, when executed by one or more computer systems, configure the one or more computer systems to collectively perform operations comprising:
   detecting an item logo and an item color of an item in an image of the item on a network page, the item color detected and determined by:
      detecting a dimension of the item logo; and
      analyzing an image dimension that is greater than the dimension of the item logo so as to capture a portion of the item adjacent to the item logo;
   determining an item attribute of the item using data available through the network page, the item attribute being associated with at least one of a model number or type of item included with the network page;
   identifying an item identifier for the item by accessing a data store of information about items, each of the items having an item identifier, the data store associated with an electronic marketplace that is separate from the network page, the identifying being based in part on the item logo, the item color, and the item attribute;
   determining at least a portion of an internet protocol (IP) address of a user device that accesses the network page comprising the item logo and the item color;
   correlating at least the portion of the IP address of the user device with a location of the user device; and
   enabling to display a link at the network page, the link corresponding with the location of the user device, the link providing access to the item and other items offered via the electronic marketplace, and the link displayed within a threshold distance from the image of the item on the network page.

2. The one or more computer-readable storage media of claim 1, wherein the item attribute is determined by analyzing text from the network page that identifies the model number or the type of item in the text.

3. The one or more computer-readable storage media of claim 1, wherein the network page is a journal, blog, item review, or news aggregator website.

4. The one or more computer-readable storage media of claim 1, wherein the electronic marketplace includes a plurality of merchants selling the item, and wherein the plurality of merchants sell the other items via the electronic marketplace.

5. A computer-implemented method, comprising:
   detecting, by a computing device, an image of an item and an item color for the item on a network page, the item color detected and determined by:
      detecting a dimension of an item logo associated with the image of the item; and
      analyzing an image dimension that is greater than the dimension of the item logo so as to capture a portion of the item adjacent to the item logo;
   determining an item attribute of the item using data available through the network page, the item attribute being associated with text corresponding with the image of the item included with the network page;
   identifying an item identifier corresponding to the item by accessing a data store of information about items, each of the items having an item identifier, the data store associated with an electronic marketplace that is separate from the network page, the identifying being based at least in part on the item attribute and the item color;
   determining at least a portion of an internet protocol (IP) address of a user device that accesses the network page comprising the item attribute;
   correlating at least the portion of the IP address of the user device with a location of the user device; and
   enabling to display a link at the network page, the link corresponding with the location of the user device, and the link providing access to the item and other items offered via the electronic marketplace.

6. The computer-implemented method of claim 5, wherein the link is displayed within a threshold distance from the image of the item on the network page.

7. The computer-implemented method of claim 5, wherein the link is included in a pop-up window overlapping the image.

8. The computer-implemented method of claim 7, wherein the pop-up window does not overlap text displayed by the network page.

9. The computer-implemented method of claim 7, wherein the user device is redirected to the location that corresponds with the link when the user device activates the link.

10. The computer-implemented method of claim 5, further comprising:
   determining dimensions of the image;
   generating a data layer or hotspot that corresponds with the dimensions of the image; and
   enabling to display the data layer or hotspot at the network page.

11. A computing device comprising:
   a memory configured to store computer-executable instructions; and
   a processor in communication with the memory configured to execute the computer-executable instructions to at least:
      detect, by the computing device, a first item and a second item in an image at a network page;
      detect an item color for the first item in the image of the network page, the item color detected and determined by:
         detecting a dimension of an item logo associated with the first item in the image; and
         analyzing an image dimension that is greater than the dimension of the item logo so as to capture a portion of a third item adjacent to the item logo associated with the first item;
      compare the detected first item and detected second item with images of items in a data store associated with an electronic marketplace that is separate from the network page;
      identify the detected first item, the identifying being based in part on the comparison between the detected first item and the images of items in the data store and an association of the first item and the second item;

determine at least a portion of an internet protocol (IP) address of a user device that accesses the network page;

correlate at least the portion of the IP address of the user device with a location of the user device; and enable to display at the network page, a link providing access to the detected first item via the electronic marketplace, the link corresponding with the location of the user device, and the link displayed within a threshold distance from the detected first item on the network page.

12. The computing device of claim 11, wherein the first item is detected in the image by:

comparing spatial relationships in the image; and determining a subset of pixels in the image that correspond with the first item based in part on the comparison of the spatial relationships.

13. The computing device of claim 11, wherein the first item is detected in the image by:

identifying a color region in the image;

determining a subset of pixels that correspond with the color region;

comparing the subset of pixels with the images of items in the data store associated with the electronic marketplace; and determining that the subset of pixels corresponds with at least one image from the data store based upon the comparison, the at least one image from the data store corresponding with the first item.

14. The computing device of claim 13, wherein the images of items in the data store include images of multiple angles of the first item.

15. The computing device of claim 11, wherein the first item is detected in the image by boundary analysis.

16. The computing device of claim 11, wherein the detection of the first item and the second item in the image is associated with a link to the image displayed on the network page.

17. The computing device of claim 11, wherein the detection of the first item and the second item in the image is associated with an image file corresponding with the image, transmitted to the electronic marketplace.

18. The computing device of claim 11, further comprising:

receiving an opt-out from the user device; and adjusting the detection of the first item and the second item in the image at the network page to not include automatically scanning the network page when the user device visits the network page.

19. The computing device of claim 11, wherein the image at the network page is scanned and discarded after a threshold amount of time.

* * * * *